(12) United States Patent
Daniels

(10) Patent No.: US 9,156,920 B2
(45) Date of Patent: *Oct. 13, 2015

(54) PROCESS FOR THE PREPARATION OF AN AQUEOUS EMULSIFIER-STABILIZED VINYL ACETATE-ETHYLENE COPOLYMER DISPERSION WITH FINE PARTICLE SIZE

(71) Applicant: Wacker Chemical Corporation, Adrian, MI (US)

(72) Inventor: Christian Leonard Daniels, Fogelsville, PA (US)

(73) Assignee: WACKER CHEMICAL CORPORATION, Adrian, MI (US)

( * ) Notice: Subject to any disclaimer, the term of this patent is extended or adjusted under 35 U.S.C. 154(b) by 306 days.

This patent is subject to a terminal disclaimer.

(21) Appl. No.: 13/627,165

(22) Filed: Sep. 26, 2012

(65) Prior Publication Data

US 2014/0088249 A1 Mar. 27, 2014

(51) Int. Cl.
| | |
|---|---|
| C08L 33/26 | (2006.01) |
| C09J 133/26 | (2006.01) |
| C09D 133/26 | (2006.01) |
| C08F 2/01 | (2006.01) |
| C08F 210/02 | (2006.01) |
| C08F 2/26 | (2006.01) |
| C08F 218/08 | (2006.01) |
| C08F 220/58 | (2006.01) |

(52) U.S. Cl.
CPC ... *C08F 2/01* (2013.01); *C08F 2/26* (2013.01); *C08F 210/02* (2013.01); *C08F 218/08* (2013.01); *C08F 220/58* (2013.01)

(58) Field of Classification Search
CPC ..... C08F 210/02; C08F 218/08; C08F 230/02
See application file for complete search history.

(56) References Cited

U.S. PATENT DOCUMENTS

| | | | |
|---|---|---|---|
| 3,404,112 A | 10/1968 | Lindemann | |
| 3,440,199 A | 4/1969 | Lindemann | |
| 3,530,080 A | 9/1970 | Inskip | |
| 3,716,504 A * | 2/1973 | Lindemann | 524/26 |
| 3,812,072 A | 5/1974 | Kuhlkamp | |
| 3,856,733 A | 12/1974 | Sturt | |
| 4,503,185 A | 3/1985 | Hausman | |
| 4,657,821 A | 4/1987 | Ura | |
| 5,071,903 A | 12/1991 | Farmer | |
| 5,874,498 A | 2/1999 | Daniels et al. | |
| 5,919,716 A | 7/1999 | Raynolds | |
| 5,996,489 A | 12/1999 | Leube | |
| 6,320,000 B1 | 11/2001 | Hurry et al. | |
| 6,660,814 B1 | 12/2003 | Kröner et al. | |
| 6,746,555 B1 * | 6/2004 | Kunstle et al. | 156/71 |
| 6,762,239 B1 * | 7/2004 | Williams | 524/547 |
| 6,841,206 B2 | 1/2005 | Quintens | |
| 6,890,975 B2 * | 5/2005 | Weitzel | 524/4 |
| 6,908,524 B2 | 6/2005 | Goldstein | |
| 2004/0048969 A1 * | 3/2004 | Kirsch et al. | 524/457 |
| 2004/0204535 A1 | 10/2004 | Confalone | |
| 2005/0261423 A1 | 11/2005 | Funkhauser et al. | |
| 2007/0244238 A1 | 10/2007 | Desor et al. | |
| 2008/0262104 A1 | 10/2008 | Angel et al. | |
| 2009/0203832 A1 | 8/2009 | Muller | |
| 2010/0130679 A1 | 5/2010 | Jakob | |
| 2011/0112218 A1 * | 5/2011 | Weitzel et al. | 523/343 |
| 2012/0214007 A1 * | 8/2012 | Daniels et al. | 428/452 |
| 2014/0088249 A1 * | 3/2014 | Daniels | 524/850 |

FOREIGN PATENT DOCUMENTS

| | | |
|---|---|---|
| EP | 1 300 448 A2 | 4/2003 |
| EP | 1 801 168 A1 | 6/2007 |
| EP | 2 106 849 A1 | 10/2009 |
| WO | 2009156341 | 12/2009 |

OTHER PUBLICATIONS

Polymer Handbook, 2$^{nd}$ Edition, J. Wiley & Sons, New York, 1975.
Fox, T. G., Bull. Am. Physics Soc., 1, 3, p. 123, 1956.
International Search Report dated Jan. 2, 2014 for Application No. PCT/US2013/060545, filed Sep. 19, 2013.
International Search Report and Written Opinion for International Application No. PCT/US2012/024232 dated May 4, 2012.
Entire patent prosecution history of U.S. Appl. No. 13/030,847, filed Feb. 18, 2011, entitled, "Paper Coating Compositions."
International Preliminary Report on Patentability for PCT/US2013/060545, completed Sep. 11, 2014.

* cited by examiner

*Primary Examiner* — Michael Pepitone
*Assistant Examiner* — Michael A Salvitti
(74) *Attorney, Agent, or Firm* — RatnerPrestia

(57) ABSTRACT

A process for preparing an aqueous emulsifier-stabilized vinyl acetate-ethylene copolymer dispersion with weight average particle size in a range from 100 nm to 300 nm includes emulsion polymerization of a reaction mixture including:

a) vinyl acetate and ethylene, b) 0.05 to 1% by weight, based on the total weight of monomers and comonomers, of at least one functional comonomer selected from the group consisting of ethylenically unsaturated monomers with at least one phosphate group or phosphonic acid group or their salts and ethylenically unsaturated sulphonic acids or their salts, c) 0.5 to 5% by weight, based on the total weight of monomers and comonomers, of at least one anionic emulsifier and optionally one or more nonionic emulsifiers, and d) optionally at most 0.5%, based on the total weight of monomers and comonomers, of a protective colloid.

The process reactor uses an external heat exchange circuit.

10 Claims, No Drawings

PROCESS FOR THE PREPARATION OF AN AQUEOUS EMULSIFIER-STABILIZED VINYL ACETATE-ETHYLENE COPOLYMER DISPERSION WITH FINE PARTICLE SIZE

FIELD OF THE INVENTION

The invention relates to a process for the preparation of an aqueous emulsifier-stabilized vinyl acetate-ethylene copolymer dispersion with fine particle size by means of emulsion polymerization in a reactor with an external heat exchange circuit equipped with a pump and with a heat exchanger.

BACKGROUND OF THE INVENTION

Emulsifier-stabilized aqueous dispersions of vinyl acetate-ethylene copolymers are used in a wide variety of applications, for example as binders in adhesive compositions and in coating compositions. These are high volume applications, and therefore large amounts of such dispersions have to be produced on an industrial scale. Shortening of cycle times of the polymerization of emulsifier-stabilized vinyl acetate-ethylene copolymer dispersion would result in a considerable economic advantage. At the same time, a key issue for obtaining high quality binders for such applications is the need to produce the dispersed vinyl acetate-ethylene copolymer particles with a fine particle size.

It is known in the art to use external cooling loops in emulsion polymerization for enhancing cooling capacity to achieve a shorter reaction time. For the shortening of polymerization time it is disclosed in U.S. Pat. No. 6,660,814 B1 to use a polymerization reactor combined with an external cooling unit, which is equipped with a low-shear pump and a heat exchanger having a laminar flow profile. EP 2 106 849 A1 teaches a process for emulsion polymerization. To improve heat removal, the polymerization reactor is combined with an external cooling loop, which is equipped with a low-shear pump and a plate and frame heat exchanger. To prevent coagulation of the polymerisation mixture, the plate and frame heat exchanger has a gap width of 6 to 18 mm. U.S. Pat. No. 6,320,000 B1 concerns an emulsion polymerization in the presence of emulsifiers. The polymerization takes place in a reactor equipped with an external cooling circuit, which includes a pump and a heat exchanger. To improve cooling capacity and to prevent gel formation, the polymerization mixture is pumped through the heat exchanger and returned to the polymerization reactor. The object of US 2005/0261423 A1 was a polymerization process providing shorter reaction time. The goal was said to be achieved with a process wherein the polymerization mixture is transferred to an external circuit which leads from and back to the polymerization reactor and which comprises a low-shear pump and a heat exchanger. US 2011/0112218 A1 describes a process for the production of a protective colloid-stabilized aqueous polymer dispersion. To improve heat dissipation and thereby shorten reaction time, an external loop is installed which includes a pump and a heat exchanger. The process uses a specific type of heat exchanger, i.e., a static mixer heat exchanger.

One problem with aqueous emulsifier-stabilized vinyl acetate-ethylene copolymer dispersions with fine particle size is their typically poor shear stability. This problem has traditionally prevented production of such dispersions in polymerization reactors employing external heat exchange circuits, which typically produce high shear. In order to make vinyl acetate-ethylene copolymer dispersions in reactors with external heat exchangers, some way must be found to increase the shear stability of the dispersions while nonetheless maintaining fine particle size, as well as good scrub resistance in paints and other coatings made from the dispersions.

US 2008/0262104 A1 discloses polyvinyl acetate dispersions having high shear stability with 0.05 to 5% by weight of (meth)acrylic acid units in the vinyl acetate copolymer. US 2007/0244238 A1 describes polymer dispersions said to have very good shear stability. These polymer dispersions comprise two copolymers with a Tg difference of at least 10° C., stabilized with a nonionic emulsifier comprising at least one aryl-substituted phenolalkyleneoxy ether.

EP 1 300 448 A2 and EP 1 801 168 disclose an aqueous vinyl acetate-ethylene dispersion used as a binder in coating compositions having a high pigment volume concentration. To improve scrub resistance, use of a combination of a phosphate-functional emulsifier and a protective colloid for stabilization during polymerization is recommended.

Despite the foregoing efforts, it has remained difficult to produce vinyl acetate ethylene copolymer dispersions having fine particle size in equipment employing an external heat exchanger. Thus, advances in this area would be a welcome addition in the industry.

SUMMARY OF THE INVENTION

In one aspect, the invention provides a process for preparing an aqueous emulsifier-stabilized vinyl acetate-ethylene copolymer dispersion with fine particle size. The process includes emulsion polymerization of a reaction mixture including:
a) vinyl acetate and ethylene,
b) 0.05 to 1% by weight, based on the total weight of monomers and comonomers, of at least one functional comonomer selected from the group consisting of ethylenically unsaturated monomers with at least one phosphate group or phosphonic acid group or their salts and ethylenically unsaturated sulphonic acids or their salts,
c) 0.5 to 5% by weight, based on the total weight of monomers and comonomers, of at least one anionic emulsifier and optionally one or more nonionic emulsifiers, and
d) optionally at most 0.5%, based on the total weight of monomers and comonomers, of a protective colloid.

The emulsion polymerization is performed in a reactor with an external heat exchange circuit including a pump and a heat exchanger, and during the emulsion polymerization the reaction mixture is circulated through the external heat exchange circuit. The copolymer dispersion particles have a weight average particle size (Dw) in a range from 100 nm to 300 nm.

DETAILED DESCRIPTION OF THE INVENTION

It was an object of the present invention to provide a process for the preparation of an aqueous emulsifier-stabilized vinyl acetate-ethylene copolymer dispersion with fine particle size, yet high shear stability. It was further desired to achieve polymer dispersions providing high scrub resistance when used in coating compositions. It has now been found that such results can be obtained by a method relying at least in part on the incorporation of specific types of functional comonomer unit(s), copolymerized with the vinyl acetate and ethylene in the presence of specific types of anionic emulsifier(s) in a reactor employing an external heat exchange loop.

The term "fine particle size" as used herein means a weight average particle size (Dw) in a range from 100 nm to 300 nm, preferably from 150 to 250 nm of the vinyl acetate-ethylene copolymer particles dispersed in the aqueous medium, as measured by capillary hydrodynamic fractionation (CHDF).

Dispersions prepared according to the invention contain very little coagulum, i.e., material retained on a 100 mesh (149 μm) screen. Typically, the amount of coagulum will be less than 1000 ppm, or less than 500 ppm, or less than 100 ppm, based on the weight of the aqueous copolymer dispersion. The compositions and preparation methods used for making such dispersions according to the invention will now be descried in detail.

Composition of the Dispersions

In general the vinyl acetate is present in the copolymer in an amount of up to 95% by weight, based on the total weight of monomers and comonomers. Preferably the vinyl acetate content is in the range of 70 to 95% by weight, more preferably the vinyl acetate content is in the range of 80 to 95% by weight, in each case based on the total weight of monomers and comonomers.

In general ethylene is present in the copolymer in an amount of ≥5% by weight, preferably 5 to 30% by weight, most preferred 5 to 20% by weight, in each case based on the total weight of monomers and comonomers.

In general the functional comonomers are copolymerized in an amount from 0.05 to 1% by weight, preferably 0.05 to 0.8% by weight, more preferably 0.2 to 0.6% by weight in each case based on the total weight of monomers and comonomers.

Preferred functional comonomers comprising ethylenically unsaturated monomers with at least one phosphate group or phosphonic acid group or their salts are 2-hydroxyethyl methacrylate phosphoric acid ester, hydroxypropyl (meth)acrylate phosphoric acid ester, 4-hydroxybutyl acrylate phosphoric acid ester, 2-hydroxybutyl acrylate phosphoric acid ester, vinylphosphonic acid, 2-methacrylamido-2-methylpropanephosphonic acid, propene-2-phosphonic acid, alpha-phosphonostyrene.

Preferred functional comonomers comprising ethylenically unsaturated sulphonic acids or their salts are vinylsulphonic acid, styrenesulphonic acid, 2-acrylamido-2-methylpropanesulphonic acid, sulphopropyl methacrylate or their salts.

If salts are used in place of the free acids, alkali metal salts (e.g., sodium salts or potassium salts) or ammonium salts are preferred.

More preferred functional comonomers are ethylenically unsaturated sulphonic acids or their alkali metal salts. Particularly preferred functional comonomers are vinylsulphonic acid or 2-acrylamido-2-methyl-propanesulphonic acid or their alkali metal salts.

In some embodiments the copolymer may include 0 to 30% by weight, preferably 0 to 10% by weight, in each case based on the total weight of monomers and comonomers, of other non-functional monomer units from the group consisting of vinyl chloride, vinyl esters and (meth)acrylic acid esters. Suitable other vinyl esters are those of carboxylic acids with 3 to 12 carbon atoms such as vinyl propionate, vinyl butyrate, vinyl 2-ethylhexanoate, vinyl laurate, 1-methyl vinyl acetate, vinyl pivalate and vinyl esters of α-branched monocarboxylic acids with 9 to 11 carbon atoms, such as VeoVa™ 9R, VeoVa™ 10R, or VeoVa™ 11R (available from Hexion Specialty Chemicals, Inc., Columbus, Ohio). Suitable methacrylic or acrylic acid esters are esters of straight-chain or branched alcohols having 1 to 15 C atoms, for example methyl acrylate, methyl methacrylate, ethyl acrylate, ethyl methacrylate, propyl acrylate, propyl methacrylate, butyl acrylate (n-, iso- and tert-), n-butyl methacrylate, 2-ethylhexyl acrylate and norbornyl acrylate. Methyl acrylate, methyl methacrylate, butyl acrylate and 2-ethylhexyl acrylate are preferred. Such non-functional monomer(s) may be introduced to, for example, adjust the glass transition temperature or degree of hydrophobicity.

Most preferred copolymers are those of ethylene and vinyl acetate without further non-functional monomers.

To adjust certain polymer properties like crosslinking, or to improve adhesion to certain substrates, auxiliary monomers may be copolymerized. Suitable auxiliary monomers are pre-crosslinking comonomers such as polyethylenically unsaturated comonomers, examples being divinyl adipate, diallyl maleate, allyl methacrylate or triallyl cyanurate, or post-crosslinking comonomers, examples being acrylamidoglycolic acid (AGA), methylacrylamidoglycolic acid methyl ester (MAGME), N-methylolacrylamide (NMA), N-methylolmethacrylamide (NMMA), N-methylolallylcarbamate, alkyl ethers such as the isobutoxy ether or esters of N-methylolacrylamide or of N-methylolmethacrylamide or of N-methylolallylcarbamate.

Also suitable as auxiliary monomers are ethylenically unsaturated, hydrolyzable silicon compounds. For example compounds of the general formula $R^1SiR_{0-2}(OR^2)_{1-3}$, where R is a $C_1$ to $C_3$ alkyl radical, $C_1$ to $C_3$ alkoxy radical or halogen (e.g., Cl or Br), $R^1$ is $CH_2$=$CR^3$—$(CH_2)_{0-1}$ or $CH_2$=$CR^3CO_2(CH_2)_{1-3}$, $R^2$ is a unbranched or branched, optionally substituted alkyl radical or acyl radical having 1 to 12 C atoms, which may optionally be interrupted by an ether group, and $R^3$ is H or $CH_3$. Preference is given to γ-acryloyl- and γ-methacryloyloxypropyltri(alkoxy)silanes, vinylalkyldialkoxy-silanes, and vinyltrialkoxysilanes, having $C_1$ to $C_{12}$ alkoxy groups and optionally $C_1$ to $C_3$ alkyl radicals, and also α-silanes. Exemplary $C_1$ to $C_{12}$ alkoxy groups include methoxy, ethoxy, methoxyethylene, ethoxyethylene, methoxypropylene glycol ether and/or ethoxypropylene glycol ether radicals. Ethylenically unsaturated, hydrolyzable silicon compounds that are most preferred are vinyltrimethoxysilane, vinyltriethoxysilane, 3-methacryloyloxypropyltrimethoxysilane, 3-methacryloyl-oxypropyltriethoxysilane and α-methacryloyloxymethyl-triethoxysilane.

Further examples of auxiliary monomers are ethylenically unsaturated compounds containing epoxide groups, for example glycidyl methacrylate, glycidyl acrylate, allyl glycidyl ether, vinyl glycidyl ether, vinylcyclohexane oxide, limonene oxide, myrcene oxide, caryophyllene oxide, and styrenes and vinyltoluenes substituted by a glycidyl radical on the aromatic moiety, and also vinyl benzoates substituted by glycidyl radicals on the aromatic moiety. Preference is given to glycidyl acrylate, glycidyl methacrylate, allyl glycidyl ether, and vinyl glycidyl ether. Other useful auxiliary monomers include ureido-functional monomers comprising allyl or α,β-unsaturated carbonyl groups, for example acrylate, methacrylate, or maleic groups. Commercially available examples include SIPOMER® WAM allyl/ureido monomer, sold by Rhodia Inc., and methacrylamidoethylethyleneurea, sold in a blend with 20% methacrylic acid content by Rhodia, Inc. as SIPOMER® WAM II.

If such auxiliary monomers are copolymerized, preferably from 0.1 to 3% by weight is used, in each case based on the total weight of monomers and comonomers.

The sum of monomers and comonomers, i.e., of vinyl acetate, ethylene, functional comonomers and optionally non-functional monomers and optionally auxiliary monomers, equals 100% by weight.

The monomers and comonomers are preferably selected so as to give copolymers with a glass transition temperature Tg of −20° C. to +20° C., preferably −10° C. to +20° C., and more preferably 0° C. to 15° C. The glass transition temperature Tg of the copolymers may be determined in a known manner by differential scanning calorimetry (DSC). The Tg may also be calculated approximately in advance by means of the Fox equation. According to Fox T. G., Bull. Am. Physics Soc. 1, 3, page 123 (1956), it holds that: $1/Tg=x_1/Tg_1+x_2/Tg_2+ \ldots +x_n/Tg_n$, where $x_n$ is the mass fraction (% by weight/100) of the monomer n and $Tg_n$ is the glass transition temperature, in kelvins, of the homopolymer of the monomer n. Tg values for homopolymers are listed in Polymer Handbook, 2nd Edition, J. Wiley & Sons, New York (1975).

Examples of suitable anionic emulsifiers are sodium, potassium, and ammonium salts of straight-chain aliphatic carboxylic acids having 12 to 20 C atoms; sodium hydroxyoctadecanesulfonate; sodium, potassium, and ammonium salts of hydroxyl-fatty acids having 12 to 20 C atoms and the sulfonation and/or acetylation products thereof; sodium, potassium, ammonium and triethanolamine salts of alkyl sulfates, and sodium, potassium, and ammonium salts of alkylsulfonates having in each case 10 to 20 C atoms and of alkylarylsulfonates having 12 to 20 C atoms; dimethyldialkyl-ammonium chloride having 8 to 18 C atoms and its sulfonation products; sodium, potassium, and ammonium salts of sulfosuccinic esters with aliphatic saturated monohydric alcohols having 4 to 16 C atoms, and sulfosuccinic 4-esters with polyethylene glycol ethers of monohydric aliphatic alcohols having 10 to 12 C atoms, more particularly their disodium salts, and of sulfosuccinic 4-ester with polyethylene glycol nonylphenyl ether, more particularly its disodium salt, and of biscyclohexyl sulfosuccinate, more particularly its sodium salt; ligninsulfonic acid and also its calcium, magnesium, sodium, and ammonium salts; resin acids and also hydrogenated and dehydrogenated resin acids, and also their alkali metal salts. Other useful anionic surfactants include phosphate esters of alcohol ethoxylates, for example a phosphate ester of tridecyl alcohol ethoxylate sole commercially as RHODAFAC® RS-610 by Rhodia.

The most preferred anionic emulsifiers are the sodium, potassium, and ammonium salts of alkyl sulfates and of alkylsulfonates having in each case 10 to 20 C atoms, and also the sodium, potassium, and ammonium salts of alkylarylsulfonates having 12 to 20 C atoms, and the sodium, potassium, and ammonium salts of sulfosuccinic esters with aliphatic saturated monohydric alcohols having 4 to 16 C atoms.

In addition to the anionic emulsifier (s, one or more nonionic emulsifiers may be added. Suitable nonionic emulsifiers are, for example, acyl, alkyl, oleyl, and alkylaryl ethoxylates. These products are available commercially, for example, under the name Genapol® or Lutensol®. They include ethoxylated mono-, di-, and tri-alkylphenols, preferably having a degree of ethoxylation of 3 to 50 ethylene oxide units and $C_4$ to $C_{12}$ alkyl radicals. Suitable nonionic emulsifiers are also ethoxylated branched or unbranched fatty alcohols (aliphatic alcohols), preferably having a degree of ethoxylation of 3 to 80 ethylene oxide units and $C_6$ to $C_{36}$ alkyl radicals. Suitable nonionic emulsifiers are also $C_{13}$-$C_{15}$ oxo-process alcohol ethoxylates having a degree of ethoxylation of 3 to 30 ethylene oxide units, $C_{16}$-$C_{18}$ fatty alcohol ethoxylates having a degree of ethoxylation of 11 to 80 ethylene oxide units, $C_{10}$ oxo-process alcohol ethoxylates having a degree of ethoxylation of 3 to 11 ethylene oxide units, $C_{13}$ oxo-process alcohol ethoxylates having a degree of ethoxylation of 3 to 20 ethylene oxide units, polyoxyethylenesorbitan monooleate having 20 ethylene oxide groups, copolymers of ethylene oxide and propylene oxide with a minimum content of at least 10% by weight of ethylene oxide, polyethylene oxide ethers of oleyl alcohol, having a degree of ethoxylation of 4 to 20 ethylene oxide units, and also the polyethylene oxide ethers of nonylphenol having a degree of ethoxylation of 4 to 20 ethylene oxide units.

Preferred are ethoxylated branched or unbranched aliphatic alcohols, particularly having a degree of ethoxylation of 3 to 80 ethylene oxide units and $C_8$ to $C_{36}$ alkyl radicals. Preferred nonionic emulsifiers are also $C_{13}$-$C_{15}$ oxo-process alcohol ethoxylates having a degree of ethoxylation of 3 to 30 ethylene oxide units, and $C_{16}$-$C_{18}$ aliphatic alcohol ethoxylates having a degree of ethoxylation of 11 to 80 ethylene oxide units. Particularly preferred are $C_{12}$-$C_{14}$ aliphatic alcohol ethoxylates having a degree of ethoxylation of 3 to 20 ethylene oxide units.

The total amount of emulsifier is typically in a range from 0.5 to 5% by weight, preferably 1 to 3% by weight, based in each case on the total weight of the monomers. The anionic emulsifier(s) will typically constitute at least 25 wt %, or at least 35 wt %, or at least 45 wt %, or at least 55%, or at least 65% of the total emulsifier, with nonionic emulsifier(s) making up the balance. The anionic emulsifier(s) may constitute all of the emulsifier, or at most 95 wt %, or at most 85 wt %, or at most 75 wt %.

Optionally, one or more protective colloids may be used in addition to the emulsifier(s). Suitable protective colloids are polyvinyl alcohols; polyvinyl acetals; polyvinylpyrrolidones; polysaccharides in water-soluble form such as starches (amylase and amylopectin), celluloses and their carboxymethyl-, methyl-, hydroxyethyl-, hydroxypropyl-derivatives; proteins such as casein or caseinate, soya protein, gelatine; lignosulfonates; synthetic polymers such as poly(meth)acrylic acid, copolymers of (meth)acrylates with carboxyl-functional comonomer units, poly(meth)-acrylamide, polyvinylsulfonic acids, and the water-soluble copolymers thereof; melamine-formaldehyde sulfonates; naphthalene-formaldehyde sulfonates; styrene-maleic acid copolymers and vinyl ether-maleic acid copolymers.

If protective colloids are used, preference is given to using partially hydrolyzed or fully hydrolyzed polyvinyl alcohols, more preferably partially hydrolyzed polyvinyl alcohols having a degree of hydrolysis of 80 to 95 mol % and a Höppler viscosity, in 4% strength aqueous solution, of 1 to 30 mPas (method of Höppler at 20° C., DIN 53015). Most preferred are polyvinyl alcohols having a degree of hydrolysis of 85 to 94 mol % and a Höppler viscosity, in 4% strength aqueous solution, of 3 to 25 mPas (method of Höppler at 20° C., DIN 53015). The stated protective colloids are commercially available or obtainable by means of processes known to the skilled person.

If protective colloids are added, they will typically be in an amount of 0.05 to 0.5% by weight, more preferably 0.05 to 0.1% by weight, in each case based on the total weight of the monomers. In a preferred embodiment, no protective colloids are used.

Preparation of the Dispersions

The aqueous copolymer dispersions can be prepared by emulsion polymerization using conventional emulsion polymerization procedures, typically at a temperature in a range from 40° C. to 150° C., more typically 50° C. to 120° C. and most typically 60° C. to 100° C. The polymerization pressure is generally between 40 and 100 bar, more typically between 45 and 90 bar, and may vary particularly between 45 and 85 bar, depending on the ethylene feed.

Polymerization may be initiated using a redox initiator combination such as is customary for emulsion polymerization. Examples of suitable oxidizing agents are the sodium, potassium, and ammonium salts of peroxodisulfuric acid, hydrogen peroxide, t-butyl peroxide, t-butyl hydroperoxide, potassium peroxodiphosphate, tert-butyl peroxopivalate, cumene hydroperoxide, isopropylbenzene monohydroperoxide, azo-bisisobutyronitrile. Preference is given to the sodium, potassium, and ammonium salts of peroxodisulfuric acid and to hydrogen peroxide. The stated initiators are used in general in an amount of 0.01% to 2.0% by weight, based on the total weight of the monomers.

Thee foregoing oxidizing agents, and especially salts of peroxodisulfuric acid, may also be used on their own as thermal initiators.

Suitable reducing agents are sulfites and bisulfites of the alkali metals and of ammonium, for example sodium sulfite, the derivatives of sulfoxylic acid such as zinc sulfoxylates or alkali metal formaldehyde sulfoxylates, for example sodium hydroxymethanesulfinate (Brüggolit). It is preferred to use a non-formaldehyde generating redox initiation system. In general, suitable non-formaldehyde generating reducing agents for redox pairs include, as non-limiting examples, those based on ascorbic acid or its salts, or erythorbate (iso-ascorbic acid) or its salts, or tartaric acid or its salts, or bisulfite salts, particularly sodium bisulfite, as known in the art, or sodium hydroxymethanesulfinate, which is available as a commercial reducing agent known as BRUEGGOLITE® FF6M manufactured by Brueggeman Chemical of Heilbronn, Germany. The amount of reducing agent is preferably 0.015% to 3% by weight, based on the total weight of the monomers.

Molecular weight may be controlled by use of regulating substances during the polymerization. If regulators are used, they are employed typically in amounts between 0.01% to 5.0% by weight, based on the total weight of the monomers to be polymerized, and are metered separately or else as a premix with reaction components. Examples of such substances are n-dodecyl mercaptan, tert-dodecyl mercaptan, mercaptopropionic acid, methyl mercaptopropionate, isopropanol, and acetaldehyde. It is preferred not to use any regulating substances.

All of the monomers may form an initial charge, or all of the monomers may form a feed, or portions of the monomers may form an initial charge and the remainder may form a feed after the polymerization has been initiated. The feeds may be separate (spatially and chronologically), or all or some of the components may be fed after pre-emulsification. In a preferred embodiment at least a part of the monomers is added in the initial charge, preferably 5 to 50% by weight of the monomers are added in the initial charge.

All of the emulsifier may form an initial charge, or all of the emulsifier may form a feed, or portions of the emulsifier may form an initial charge and the remainder may form a feed after the polymerization has been initiated. The feeds may be separate (spatially and chronologically), or all or some of the components may be fed after pre-emulsification.

Once the polymerization process has ended, post-polymerization may be carried out using known methods to remove residual monomer, one example of a suitable method being post-polymerization initiated by a redox catalyst. Volatile residual monomers may also be removed by distillation, preferably at subatmospheric pressure, and, where appropriate, by passing inert entraining gases, such as air, nitrogen, or water vapor, through or over the material.

The solids content of aqueous copolymer dispersion is typically in a range from 45% to 75% by weight.

Suitable reactors for the preparation of the emulsifier-stabilized vinyl acetate-ethylene copolymer dispersions according to the present invention are appropriately dimensioned steel reactors designed for high pressure use, and which have the conventional agitator equipment, measurement and control equipment as well as lines for introducing the starting materials and for discharging the products.

The reactor is equipped with an external heat exchange circuit that includes a pump and a heat exchanger. By "external heat exchange circuit" is meant a heat exchanger, pump and pipeline that takes the reaction mixture from the reactor to the heat exchanger and returns it to the reactor. The material of construction of the pipeline and of the heat exchanger is not critical to the invention. Typically, stainless steel may be used.

The external heat exchange circuit of an appropriately dimensioned pipeline is equipped with an integrated pump and a heat exchanger. The location of the connection for withdrawing the polymerization mixture into the external heat exchange circuit is normally within the lower third of the reactor, preferably at the base of the reactor. The connection for returning the polymerization mixture from the external heat exchange circuit into the reactor is at a site differing from that of the connection for withdrawing the mixture, and is generally in the upper third of the reactor, preferably at the top of the reactor.

The type of heat exchanger is not critical. The heat exchanger may be a shell and tube, plate and frame, plate and fin, a spiral heat exchanger or a static mixer heat exchanger. The material of construction of the heat exchanger is not critical to the invention. Typically, stainless steel may be used.

The type of pump used is not critical. Examples of suitable pumps are non-chokeable pumps (vortex) or displacement pumps. Preference is given to displacement pumps, and particular preference is given to screw pumps, e.g., rotary screw pumps. The dimensioning of the pump is preferably such that it withstands a pressure of up to 100 bar, preferably from 40 to 100 bar.

In addition to the external heat exchange circuit, the reactor may optionally be equipped with an internal heating/cooling system such as jacket heating/cooling or heating/cooling coils. In a preferred embodiment only an external heat exchange circuit is used for cooling or heating the reaction mixture.

Uses of the Dispersions

The aqueous emulsifier-stabilized vinyl acetate-ethylene copolymer dispersions are suitable for use in typical applications, for example as binders for paints and other coating and adhesive compositions, or as coatings or binders for textiles or paper.

The dispersions may be used to make coating compositions comprising the copolymer dispersion admixed with one or more pigments and/or one or more fillers. The dispersions may for example be used in polymeric emulsion paints, in masonry paints or interior paints, and in polymeric dispersion renders. Suitable formulations for polymeric emulsion paints and polymeric dispersion renders are known to the skilled person, and generally include 5% to 50% by weight of the aqueous copolymer dispersion, 5% to 35% by weight of water, 5% to 80% by weight of one or more fillers, 5% to 30% by weight of one or more pigments, and also 0.1% to 10% by weight of further additives, the figures in % by weight in the formulation adding up to 100% by weight.

Examples of suitable fillers include carbonates such as calcium carbonate in the form of calcite, chalk, and marble, and also magnesium calcium carbonate in the form of dolomite. Other examples are silicates, such as magnesium silicate in the form of talc, finely ground quartz, quartz sand, highly disperse silica, feldspar, and or aluminosilicates such as loam and clays. Also suitable are fiber fillers. In actual practice, mixtures of different fillers are frequently used. Polymeric renders generally comprise more coarsely particulate fillers than do emulsion paints, often between 0.2 and 5.0 mm. Otherwise, polymeric renders may comprise the same additives as emulsion paints.

Examples of suitable pigments include titanium dioxide, zinc oxide, iron oxides, and carbon black as inorganic pigments, and also the customary organic pigments. Examples of other additives are wetting agents in fractions of generally 0.1% to 0.5% by weight, based on the overall weight of the formulation. Suitable specific examples are sodium and potassium polyphosphates, polyacrylic acids and salts thereof. Additives may also include thickeners, which are used generally in an amount of 0.01% to 2.0% by weight, based on the overall weight of the formulation. Customary thickeners are cellulose ethers, starches, or inorganic thickener, e.g., bentonite. Further additives may include preservatives, defoamers and freeze-thaw stabilizers.

To produce adhesive and coating materials, the copolymer dispersion is mixed and homogenized with the other formulation ingredients, filler, and further adjuvants in suitable mixers. If the desired product has a pasty consistency, it is common to first introduce the water fraction, then add the dispersion, and finally to incorporate the solids with stirring.

The pigment-volume concentration (PVC) of pigmented coating materials such as polymeric emulsion paints is typically within a range from 10% to 90%, and is calculated in line with the following formula: $PCV(\%) = (V_{P+F} \times 100)/(V_{P+F} + V_B)$ where $V_{P+F}$ = sum of volume of pigment and filler, $V_B$ = volume of binder. At a PVC≥50%, coating materials are termed highly filled.

The examples below serve to further explain aspects of the invention.

EXAMPLES

Example 1

A pressure reactor equipped with a stirrer was used, employing only an external heat exchange circuit for heating/cooling. The heat exchanger was a shell and tube heat exchanger, and the volume of the exchanger circuit was about 44% of that of the reactor. The pump in the external heat exchange circuit was a rotary screw pump.

To the reactor was charged 46.71 parts of deionized (DI) water, 1.47 parts of AEROSOL® MA-25I (sodium dihexyl sulfosuccinate), 0.027 parts of sodium acetate, 0.0026 parts of ferrous ammonium sulfate. The pH of the charge was adjusted to 4.4 with 0.029 parts of acetic acid. Agitation was begun and 13.67 parts of vinyl acetate was charged. After the initial charging, the reactor was heated to 55° C. exclusively by pumping the reaction mixture through the external heat exchange circuit. Then 13.66 parts of ethylene was charged. To initiate polymerization an aqueous solution of 5.5% sodium persulfate and 3.3% sodium bicarbonate was fed at 1.01 parts per hour and a second aqueous solution of 3.3% sodium erythorbate was also fed at 1.01 parts per hour. Upon evidence of an exotherm, two additional feeds were begun: 72.67 parts of vinyl acetate was added over 90 minutes and an aqueous feed consisting of 11.35 parts water, 1.52 parts of PLURONIC® L64 (ethylene oxide/propylene oxide block copolymer supplied by BASF), 0.505 parts of acrylamido methyl propane sulfonic acid (supplied by Lubrizol as a 50% solution of the sodium salt under the trade name AMPS® 2403), 1.01 parts of RHODAFAC® RS-610 (phosphate ester of tridecyl alcohol ethoxylate supplied by Rhodia), and 0.12 parts of 50% sodium hydroxide was fed uniformly over 90 minutes. When the monomer feeds were begun, the temperature was ramped from 55° C. to 85° C. over 45 minutes and then held at 85° C. for the remainder of the reaction. The addition rates of the sodium persulfate and sodium erythorbate solutions were kept constant for the 90 minute period while the vinyl acetate monomer feed was being added. After the vinyl acetate feed was complete the rate of addition of the persulfate and erythorbate solutions was gradually increased until the conversion of monomer was largely complete. A total of 3.0 parts of both solutions were added to the reactor over the entire period.

The reaction mixture was then cooled to 35° C. via pumping it through the external heat exchanger. Then it was transferred to a second vessel where residual ethylene was allowed to vent off, reducing the pressure to near atmospheric conditions. At this point 0.89 parts of RHODOLINE® 670 (a proprietary defoamer composition supplied by Rhodia) was added to reduce foaming. To further complete conversion of vinyl acetate, 1.3 parts of an 8% aqueous solution of sodium erythorbate and a second aqueous solution of 1.05 parts of 7% t-butyl hydroperoxide were fed separately over a period of 15 minutes.

The physical properties of the resultant latex were:

| | |
|---|---|
| Solids content | 56.42% |
| Tg | 5.7° C. (onset) |
| Viscosity | 1010 cps (Brookfield LVF viscometer 60 rpm; T = 25° C., Spindle No. 3) |
| pH | 5.2 |
| Coagulum* | 23 ppm |
| Particle Size* | Dw 231 nm |

*Particle size Dw was measured by Capillary Hydrodynamic Fractionation (CHDF) using a CHDF 2000 unit supplied by Matec Applied Sciences of Northborough MA 10532 USA. Coagulum was material retained on a 100 mesh (149 µm) screen.

Comparative Example 2

The procedure was as in Example 1, except that a pressure reactor equipped with a stirrer was used, with heating/cooling provided directly by the reactor without using an external heat exchange circuit.

The physical properties of the resultant latex were:

| | |
|---|---|
| Solids content | 55.5% |
| Tg | 6.1° C. (onset) |
| Viscosity | 538 cps (Brookfield LVF viscometer 60 rpm, T = 25° C., Spindle No. 3) |
| pH | 4.5 |
| Coagulum | 4 ppm |
| Particle Size | Dw 222 nm |

Comparative Example 3

The procedure was as in Comparative Example 2, but with the 0.505 parts of acrylamido methyl propane sulfonic acid replaced by 1.01 parts (i.e., twice the amount) of acrylic acid.

The physical properties of the resultant latex were:

| | |
|---|---|
| solids content | 56.9% |
| Tg | 5.75° C. (onset) |
| Viscosity | 89 cps (Brookfield LVF viscometer 60 rpm, T = 25° C., Spindle No. 2) |
| pH | 4.69 |
| Coagulum | 184 ppm |
| Particle Size | Dw 290 nm |

Comparative Example 4

The procedure was as in Comparative Example 3, but using only 0.505 parts rather than 1.01 parts of acrylic acid, to match the amount of acrylamido methyl propane sulfonic acid used in Example 1. The resulting dispersion contained so much coagulum that it was judged unusable.

The dispersions prepared in Example 1 and Comparative Examples 2 and 3 were formulated into paints using the following recipe.

| Grind Ingredients | |
|---|---|
| Water | 200.0 |
| Dispersant, 2-amino-2-methyl-propanol (AMP-95, Angus)) | 1.5 |
| Preservative (Proxel BD 20, Arch Chemicals Inc.) | 1.0 |
| Dispersant (Coadis BR 40, Coatex Inc.) | 7.5 |
| Surfactant (Triton CF-10, Dow Chemical) | 2.0 |
| Defoamer (Drew T-4507, Ashland Inc.) | 2.0 |
| Titanium dioxide pigment (Ti-Pure R-706) | 200.0 |
| Titanium dioxide pigment (Optiwhite) | 100.0 |
| Filler, Silica (Minex 4, Nephton) | 130.0 |
| Thickener, attapulgite (Attagel 50, BASF) | 5.0 |
| Let-Down Ingredients | |
| Dispersion at 55 wt % solids | 280.0 |
| Polyurethane thickener (Coapur 3025, Coatex Inc.) | 8.0 |
| Polyurethane thickener (Coapur 817W, Coatex Inc.) | 36.5 |
| Defoamer (Drew T-4507, Ashland Inc.) | 3.0 |
| Water | 167.0 |
| TOTAL: | 1143.5 |

The Grind mixture was subjected to high-speed mixing, and once the pigment was dispersed the Let-Down mixture was added and admixed.

Scrub resistance (wet abrasion) of the resulting paint was evaluated in each case according to ASTM D2486-06 Test Method B of Standard Test Methods for Scrub Resistance of Wall Paints, with the following modifications: 3 mil (76 μm) Bird Bar was used in place of a 7 mil (178 μm) Dow Bar. A 3 day cure at constant temperature and humidity conditions (set at 50% relative humidity and 72° F., i.e., 22° C.) was used in place of the prescribed 7 day cure under ambient conditions. The cycles until failure were determined. The results were as follows.

| | Scrub Cycles |
|---|---|
| Example 1 | 2252 |
| Comparative Example 2 | 2240 |
| Comparative Example 3 | 416 |

The paint prepared with the dispersion of Example 1, which was produced by cooling/heating only with an external heat exchange circuit, gave essentially the same scrub resistance as that prepared with the dispersion of Comparative Example 2, which used direct reactor cooling/heating. But the paint prepared with the dispersion of Comparative Example 3, which replaced the sulfonic acid monomer AMPS® 2403 with acrylic acid at twice the level, gave only 416 scrub cycles until failure. Thus, even under low-shear conditions using direct reactor temperature regulation, replacement of the sulfonic acid with acrylic acid resulted in greatly diminished performance. But surprisingly, the high shear treatment resulting from use of the external heat exchanger in Example 1 did not destabilize the dispersion made with the monomer/comonomer and emulsifier combination used there.

Although the invention is illustrated and described herein with reference to specific embodiments, the invention is not intended to be limited to the details shown. Rather, various modifications may be made in the details within the scope and range of equivalents of the claims without departing from the invention.

The invention claimed is:

1. A process for preparing an aqueous emulsifier-stabilized vinyl acetate-ethylene copolymer dispersion with fine particle size, comprising emulsion polymerization of a reaction mixture comprising:
   a) vinyl acetate and ethylene,
   b) 0.05 to 1% by weight, based on the total weight of monomers and comonomers, of at least one functional comonomer selected from the group consisting of ethylenically unsaturated monomers possessing at least one phosphate group or phosphonic acid group or their salts and ethylenically unsaturated sulphonic acids or their salts,
   c) 0.5 to 5% by weight, based on the total weight of monomers and comonomers, of at least one anionic emulsifier and optionally one or more nonionic emulsifiers, and
   d) 0 to 0.5%, based on the total weight of monomers and comonomers, of a protective colloid,
   wherein the emulsion polymerization is performed in a reactor with an external heat exchange circuit comprising a pump and a heat exchanger, and during the emulsion polymerization the reaction mixture is circulated through the external heat exchange circuit,
   wherein the copolymer dispersion as formed contains less than 1000 ppm of coagulum, and
   wherein the copolymer dispersion particles have a weight average particle size Dw in a range from 100 nm to 300 nm.

2. The process of claim 1, wherein the vinyl acetate constitutes in a range from 70 to 95% by weight, and the ethylene constitutes 5 to 20% by weight, based on the total weight of monomers and comonomers.

3. The process of claim 1, wherein the at least one functional comonomer is selected from the group consisting of ethylenically unsaturated sulphonic acids and their salts.

4. The process of claim 1, wherein the at least one functional comonomer constitutes in a range from 0.05 to 0.8% by weight, based on the total weight of monomers and comonomers.

5. The process of claim 1, wherein the anionic emulsifier comprises one or more members selected from the group consisting of sodium, potassium, or ammonium salts of alkyl sulfates or of alkylsulfonates having in each case 10 to 20 C atoms, sodium, potassium, or ammonium salts of alkylarylsulfonates having 12 to 20 C atoms, and the sodium, potassium, or ammonium salts of sulfosuccinic esters with aliphatic saturated monohydric alcohols having 4 to 16 C atoms.

6. The process of claim 1, wherein the reaction mixture comprises said one or more nonionic emulsifiers.

7. The process of claim 1, wherein the amount of anionic emulsifier and optionally nonionic emulsifier in total is 1 to 3% by weight, based on the total weight of monomers and comonomers.

8. The process of claim 1, wherein the reaction mixture is free of protective colloids.

9. The process of claim 1, wherein the protective colloid is present in an amount of 0.05 to 0.5% by weight, based on the total weight of the monomers and comonomers.

10. A coating or adhesive composition comprising a copolymer dispersion prepared by the process of claim 1, admixed with one or more pigments and/or one or more fillers.

* * * * *